(No Model.)
J. H. GOLLEHON & W. P. BONHAM.
MAIL BAG CATCHER.
No. 388,274. Patented Aug. 21, 1888.
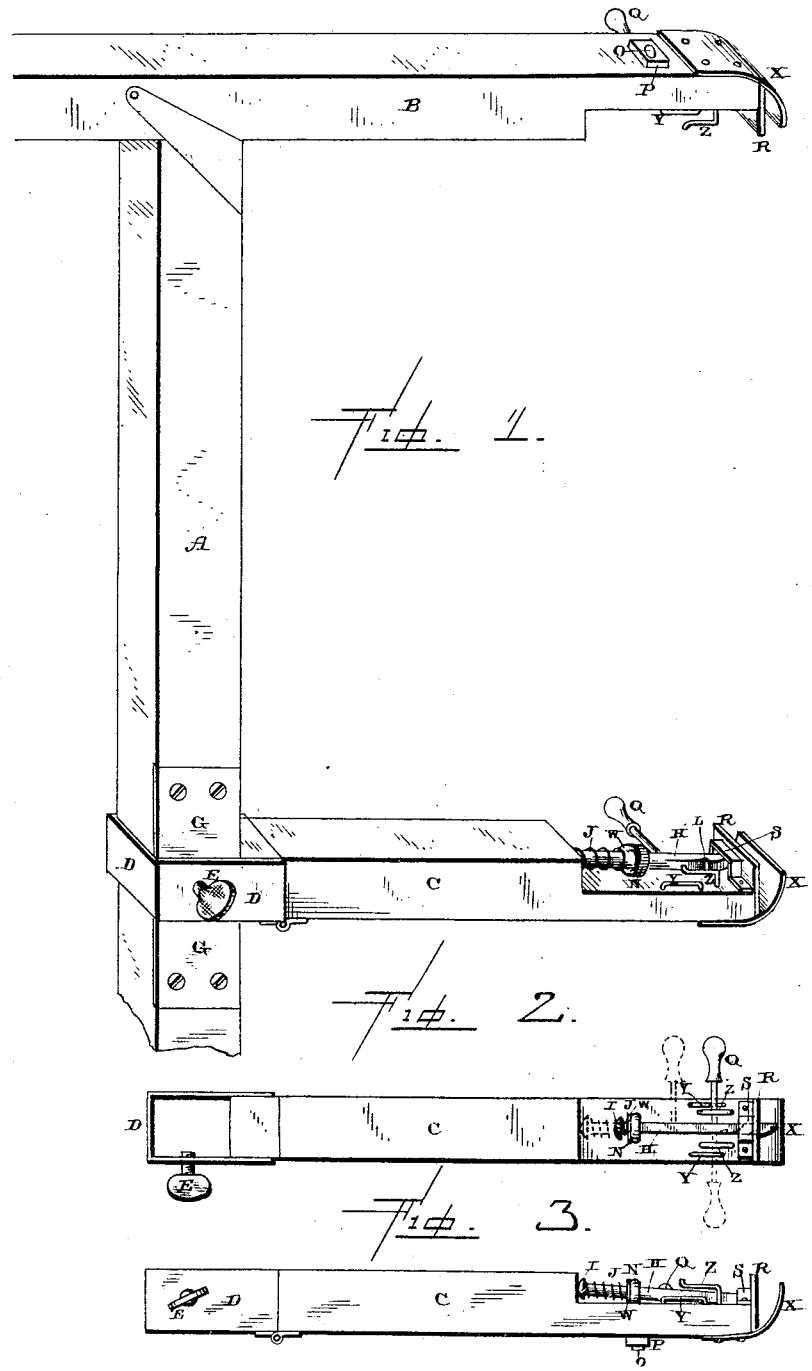

UNITED STATES PATENT OFFICE.

JOSEPH H. GOLLEHON AND WILLIAM P. BONHAM, OF MARION, VIRGINIA.

MAIL-BAG CATCHER.

SPECIFICATION forming part of Letters Patent No. 388,274, dated August 21, 1888.

Application filed February 28, 1888. Serial No. 265,537. (No model.)

*To all whom it may concern:*

Be it known that we, JOSEPH H. GOLLEHON and WILLIAM P. BONHAM, of Marion, in the county of Smyth and State of Virginia, have invented certain new and useful Improvements in Mail-Bag Catchers; and we do hereby declare the following to be a full, clear, and exact description of the invention, such as will enable others skilled in the art to which it pertains to make and use it, reference being had to the accompanying drawings, which form part of this specification.

Our invention relates to an improvement in mail-bag catchers; and it consists in, first, the combination of a suitable upright, two pivoted arms connected thereto, and a spring-actuated endwise-moving rod which is attached to each arm, and upon which rods the mail-bag is held; second, the combination of the pivoted arms of a mail-bag catcher with the endwise-moving spring-actuated rods upon which the bag is suspended, and a guide secured to the end of each of the arms, and through which the rods are made to pass, each rod being provided with a shoulder and having a lateral movement in the guide, and which rods are adapted to be turned so that their shoulders will catch against either side of the guide, as will be more fully described hereinafter.

The object of our invention is to provide the catcher with spring-actuated endwise-moving rods, upon which the bag is hung, and which rods are released from the guides, through which they pass and in which they have a slight lateral movement, when the arm upon the car strikes the bag, so as to release it instantly.

Figure 1 is a perspective of a mail-bag catcher embodying our invention. Fig. 2 is a plan view of the end of one of the pivoted arms, showing the rod in different positions. Fig. 3 is a side elevation of one of the ends of the arms, showing the rod retracted.

A represents the upright or post, to the upper end of which is pivoted the arm B, which when released assumes a vertical position in the usual manner. The arm C is pivoted to the collar or sleeve D, which is passed around the post A and is secured in position by a set-screw, E, which passes through the sleeve or collar and bears against a metallic plate, G, which is secured to the side of the post A. This plate G is made of a suitable length, so that this arm C can be adjusted up or down to accommodate itself to the length of the mail-bag. When the arm C is released, it instantly drops downward.

A portion of the outer ends of the two arms B C is cut away, as shown, so as to form supports and stops for the rods H, upon which mail-bags are supported. These rods H are provided with heads I at their inner ends, which form stops or shoulders for one end of the spiral springs J to bear against, and are provided at their opposite ends with shoulders L upon one side. These rods H pass through the tubular guides or sleeves N, which are provided with screw-shanks O, which pass down through the arms B C and receive the nuts P upon their lower ends. Secured to each rod H at any suitable point is a handle, Q, by means of which the rods H, which are made circular in cross-section, can be turned freely around, and thus move the outer ends of the rods into position, according to the direction from which the train is approaching.

Upon the outer end of each of the arms B C is secured a plate, R, which has an angular guide, S, formed upon its upper edge, and through which the outer ends of the rods H pass and have a slight lateral movement. These angular guides S are made sufficiently wide to allow the outer ends of the rods H a lateral movement sufficiently far to have the shoulders L engage with or be disengaged from one side of the guides, so that the springs J can retract the rods and thus draw the ends of the rods inside of the angular guides, and thus entirely free the mail-bag from them.

If the train is approaching from the right, both rods H must be turned by their handles Q, so that the shoulders L will point toward the advancing train, and then the rods are moved endwise against the springs J, so that the outer ends of the rods will project through the angular guides S, and the shoulders L will catch behind those edges of the guides which are nearest to the train. The mail-bag is then suspended upon the ends of the two rods H, and when the usual arm connected to the mail-car catches the bag the outer ends of the rods H will be moved in the direction that the train is moving just far enough to disengage the shoulder L, when the springs J instantly force the rods H backward until their heads I strike against the shoulders of the pivoted arms. These rods, being retracted, leave the bag free to be carried along by the arm on the car, and thus there is never any danger of the bag being held long enough to cause trouble in any way. The springs J should have sufficient tension to cause the rods H to move quickly. The forward ends of these springs bear against a washer, W, which is placed against one end of the circular guide N.

To the outer end of each arm is secured a guard, X, against which the outer end of the rods H strike when they are forced outward. These guards prevent the mail bags from being blown or easily knocked from the rods.

In order to prevent any one, while the bag is suspended, from catching hold of the handle Q and turning the rod H over, the two keepers Y Z are secured to each edge of the arms near their outer ends, and between which the handle is made to catch, as shown in Fig. 2. These keepers simply prevent the rod H from being turned one-half over while it is pressed outward, but does not interfere with its movement in any other manner.

Having thus described our invention, we claim—

1. The combination of the upright, the two pivoted arms connected thereto, the notched spring-actuated rods H, provided with handles Q, the guides through which the rods pass, and the keepers Y Z, between which the handles catch, substantially as shown.

2. The combination of the pivoted arms and the spring-actuated endwise-moving rods H, provided with shoulders, with suitable guides, through which the rods pass, the outer ends of the rods being given a slight lateral play in their guides, so as to disengage the shoulders from the guides, substantially as described.

3. The combination of the pivoted arms, the spring-actuated rods H, provided with handles J and shoulder L, and the guides through which the rods move, the rods being adapted both to have a turning movement in their guides, so as to turn the shoulder in the direction of the advancing train, and having a slight lateral play at their outer ends in the angular guides, substantially as set forth.

In testimony whereof we affix our signatures in presence of two witnesses.

JOS. H. GOLLEHON.
W. P. BONHAM.

Witnesses:
SAML. D. JONES,
JNO. R. SEXTON.